(Model.) 2 Sheets—Sheet 1.
D. L. McK. WHITE.
COMBINED SEED PLANTER AND FERTILIZER DISTRIBUTER.
No. 247,590. Patented Sept. 27, 1881.
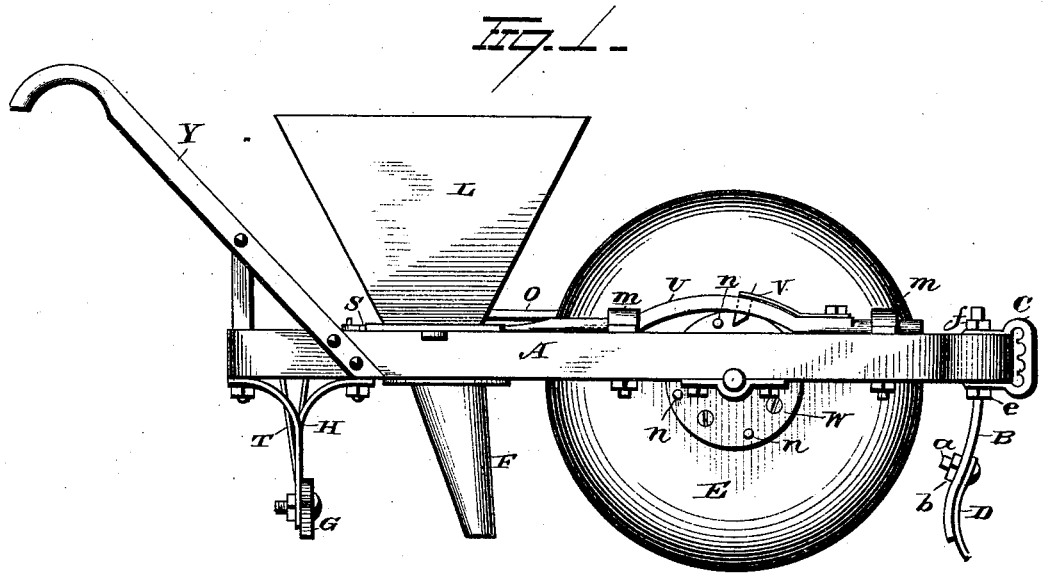
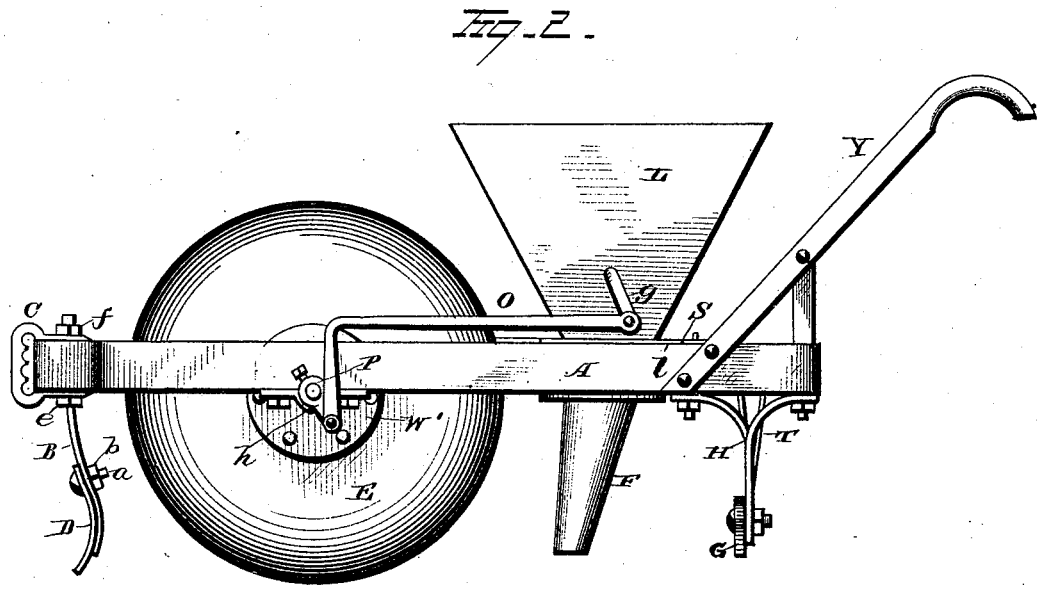
WITNESSES
INVENTOR
D. L. McKay White.
By Suggett & Suggett,
ATTORNEYS (Model.)  2 Sheets—Sheet 2.
D. L. McK. WHITE.
COMBINED SEED PLANTER AND FERTILIZER DISTRIBUTER.
No. 247,590. Patented Sept. 27, 1881.
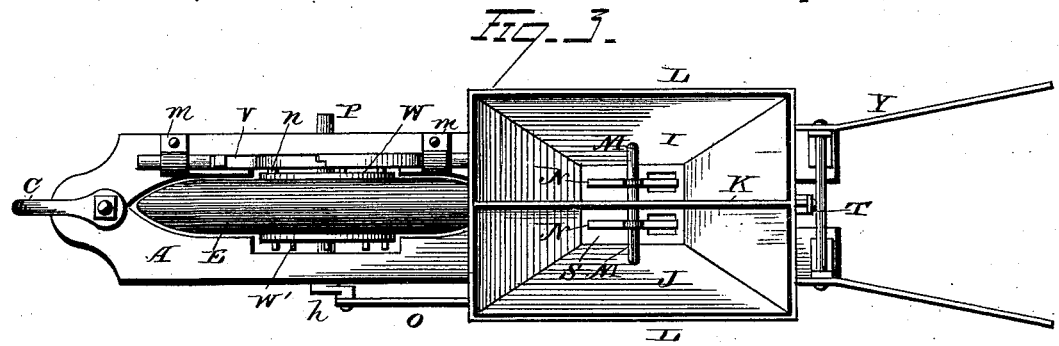
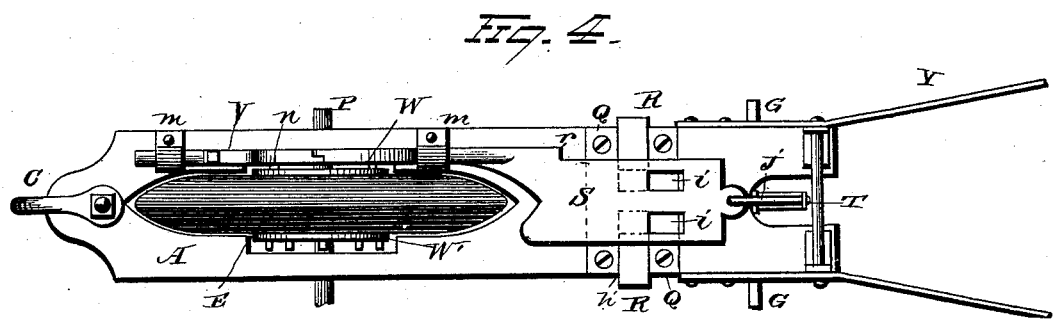
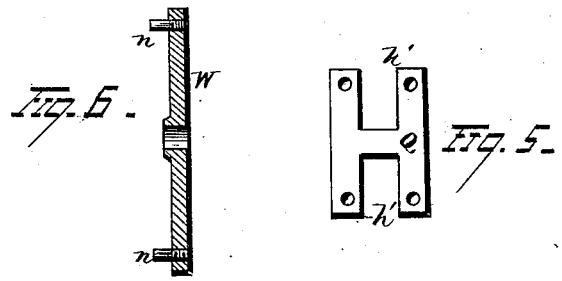
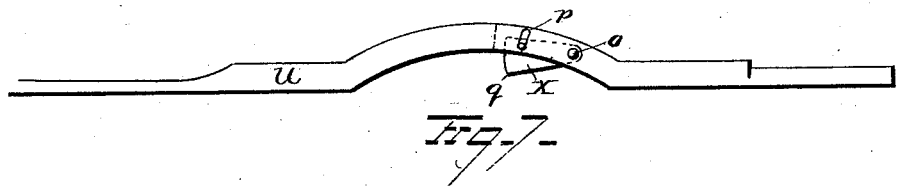
WITNESSES
E. I. Nottingham
Herman O. Moran
INVENTOR
D L McKay White
By Leggett & Leggett
ATTORNEYS.
N. PETERS. Photo-Lithographer. Washington, D. C.

UNITED STATES PATENT OFFICE.

DONALD L. McKAY WHITE, OF MANNING, SOUTH CAROLINA.

COMBINED SEED-PLANTER AND FERTILIZER-DISTRIBUTER.

SPECIFICATION forming part of Letters Patent No. 247,590, dated September 27, 1881.

Application filed June 29, 1881. (Model.)

*To all whom it may concern:*

Be it known that I, DONALD LASSFORD MC-KAY WHITE, of Manning, in the county of Clarendon and State of South Carolina, have invented certain new and useful Improvements in Combined Seed-Planter and Fertilizer-Distributer; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in combined seed-planter and fertilizer-distributer, the object of the same being to provide a machine with automatic feeding device, whereby the amount of seed and guano dropped at each forward movement of the slide can be varied at will.

A further object of my invention is to provide means whereby the movement of the spring-actuated sliding plate is made more or less frequent in proportion to the ground traversed, so as to drop the seed close together or far apart, as desired.

With these ends in view, my invention consists in certain details in construction and combinations of parts, as will be more fully explained, and pointed out in the claims.

In the accompanying drawings, Figure 1 is a side view of my improved device, showing the mechanism employed for operating the spring-actuated sliding plate. Fig. 2 is a similar view of the opposite side, showing the mechanism and manner of operating the stirrer. Fig. 3 is a plan view. Fig. 4 is plan view with the seed and fertilizer hoppers removed. Fig. 5 is a view of the H-shaped plate. Fig. 6 is a detached view, in section, of one of the metallic disks secured to the ground-wheel for operating the spring-actuated slide; and Fig. 7 is a modification.

A represents the frame or body of the machine, having the slotted standard B, secured at the front end, to which the plow-clevis C is attached at its upper end, and the adjustable drill-plow D at its lower end. This plow D is adapted to be elevated or lowered, and held in such elevated or lowered position by means of the bolt $a$ and nut $b$, the said bolt $a$ passing through an elongated slot in the standard, and the nut screwed thereon, which clamps the plow firmly to the standard. The upper portion of the standard B, between the shoulders $e$ and the upper end thereof, is adapted to clamp the ends of the clevis C, which rest respectively on the upper and lower surfaces of the frame, by passing through the said ends and frame, and securing it therein by the nut $f$, which is screwed onto the end of the standard. The plow D precedes the ground-wheel E, which latter has inclined curved sides converging toward its periphery, and runs in the furrow made by the plow, while the discharge-spout F, from the fertilizer and seed hoppers, follows between the wheel E and coverer G and drops the seed and fertilizer in the furrow, while the coverer G, attached to the bent standard H, covers and mounds the furrow.

The combined fertilizer and seed hoppers I and J are situated on the frame immediately over the discharge-spout F, and are separated from each other by the partition K. The sides L and partition K of these hoppers are perforated, through which the horizontal rock-shaft M, carrying the stirrers N, works. The outer end of the rock-shaft is provided with a crank-arm, $g$, to which the pitman O is connected, the other end of the pitman being connected to a crank-arm, $h$, rigidly secured to the wheel-shaft P.

The discharge-spout F is provided with an annular rim at its upper and larger end, by which it is secured to the frame or body A, around the opening through the frame immediately under the hopper. This opening is partly covered on top by the H-shaped plate Q, which latter is secured on top of the frame by its extremities, leaving two openings on opposite sides, one under each hopper, through which the seed and fertilizer pass in their free state to the discharge-spout, where they are brought together. The sides $h'$ of this H-shaped plate are beveled for the reception and retention of the movable plates R, the outer end of the said plates projecting at the sides of the hopper, where they are operated by moving them in or out to decrease or increase the size of the opening, and consequently allow a small or large quantity of fertilizer and seed to fall out every time the openings are uncovered by the moving of the spring-actuated sliding plate S. This sliding plate S rests on the H-shaped plate Q, and is provided with two holes, $i$, of the same size as the openings in the plate Q when the latter are completely open, and when the machine is in motion are adapted to automatically register with the said openings and be drawn backward therefrom by the V-shaped spring T. This spring is attached to the frame by its inner free end, and runs downward for a distance to the rear of the standard H, and then upward and outward, where it is provided at its other free end with an opening, into which one end of the connecting-link $j$ is secured, while the opposite end of the said link is secured to the rear end of the sliding plate S, the spring, through the intervention of the link, constantly exerting a pressure on the sliding plate, and tending to keep the plate back to its farthest limit. The sliding plate moves under the hoppers I and J, between the flanges $l$, formed on the sides thereof, which latter afford means for attaching the hoppers to the frame, and project at the front side thereof, where the arm U is rigidly secured thereto. The arm U is journaled in the bearings $m$ and curves slightly upward at the central portion of the wheel E, and is provided at this point with a spring-catch, V, which strikes the lugs $n$ on the sides of the wheel, and is caused to be moved forward thereby until the lug passes the same, when the arm U and plate S are caused to resume their former positions by the spring T acting on the rear end of the sliding plate. When the machine is moved backward the lugs simply elevate the spring-catch, which allows them to pass under without affecting the position of the arm, and consequently the sliding plate.

The wheel E is provided on each side with the metallic disks W and W', the former being provided with four movable lugs and the latter with eight lugs, which, when placed on the side of the frame carrying the arms U, cause the arm to move forward as many times as there are lugs in the disk. The wheel is removable, and is adapted to be turned around, so as to have either disk on the arm side of the machine, according to the space desired between the hills, thereby increasing or decreasing the space between the hills.

When it is desired to have only two or one hill in the length of ground traversed at each revolution of the wheel, it is simply necessary to remove two or three lugs $n$ from the disk containing the four lugs, and when it is desired to increase the number of hills in one revolution of the wheel it is necessary to turn the wheel around so as to bring the disks having the eight lugs thereon around to the arm side of the machine, and in this way regulate the sowing to suit the quality of the ground and surrounding circumstances.

Instead of having one disk on each side of the wheel, only one disk provided with any suitable number of holes can be used, into which removable lugs can be placed when it is desired to increase the number of drops to each revolution of the wheel, and thereby do away with the necessity of removing the wheel when it is desired to increase or diminish the movement of the sliding plate S. So, also, can a gravity-catch, X, be used, as shown in Fig. 7, instead of the spring-catch heretofore described. This gravity-catch can be situated on one side of the arm, or in a slot formed therein, and pivoted thereto by the pivot-pin $o$. The upper portion of this catch is provided with one or two projections, according to the situation, which fit and move in the arc-shaped slot $p$, while the lower end, $q$, thereof hangs below the curved portion of the arm and presents a flat bearing-surface for the advancing lugs $n$, which carry the arm U forward, and a curved front surface, which, when the wheel is revolving backward and the lugs retreating, rises and allows them to pass freely without affecting the position of the arm U or sliding plate S. So, also, can the pitman O be connected to the sliding plate S in front of the hoppers I and J, instead of to the crank-arm $h$ on the shaft P, which will produce a quick movement simultaneous with the sliding plate; but the manner shown answers all purposes in a very satisfactory manner. The sliding plate is limited in its backward movement by the shoulder $r$ formed thereon abutting against the flange on the hopper J.

The above-described device is simple in its construction and only requires the attention of an ordinary farm-hand, as it is automatic and thorough in its operation, and needs no attention but that necessary to keep it in a straight line, which is done by the operator, who follows the planter and manages it by the handles Y.

To operate the machine it is simply necessary to load the hoppers with the seed and fertilizers and start the machine in motion. The drill-plow forms the furrow, while the ground-wheel, which travels therein, operates the sliding plate and stirrers, and the coverer follows behind all and covers and mounds the earth over the planted seed.

When it is desired to move the machine forward without operating the sliding plate, the spring or gravity catch, as the case may be, is raised, so as not to interfere or come in contact with the lugs $n$ on the disks W and W'.

When it is desired to drop the seed and fertilizer continuously in drills, it is simply necessary to disconnect the spring T from the rear of the sliding plate S, when the lugs on the ground-wheel will carry the said plate forward until the openings therein register with the openings in the H-shaped plate, where they remain and allow a continuous stream of seed and fertilizer to drop out, which stream can be increased or diminished at will when dropping.

It is evident that numerous changes, both in the construction and location of the different parts of my improved device, may be resorted to without departing from the spirit of my invention; and hence I would have it understood that I do not limit myself to the exact construction of parts shown and described, but consider myself at liberty to make such changes as come within the spirit of my invention.

Having fully described my invention, what I claim as new, and desire to secure by Letters Patent, is—

1. In a combined seed-planter and fertilizer-distributer, the combination, with the hopper provided with two compartments, the shaft M, and the stirrers N N, of the H-shaped plate Q, the adjustable slides R R, fitted within the open slots in said plate Q and arranged to project from opposite sides of the hopper, and the sliding plate S, substantially as set forth.

2. In a combined seed-planter and fertilizer-distributer, the combination, with the sliding plate S and arm U, provided with a yielding pawl, V, of the reversible ground-wheel E, having a different number of lugs attached to the opposite sides thereof, substantially as set forth.

In testimony that I claim the foregoing I have hereunto set my hand and seal this 6th day of June, 1881.

D. L. McKAY WHITE. [L. S.]

Witnesses:
W. I. CLARK,
CHAS. H. PACK.